United States Patent [19]

Schloegl et al.

[11] Patent Number: 5,175,051

[45] Date of Patent: Dec. 29, 1992

[54] BIAXIALLY ORIENTED PLASTICS FILM

[75] Inventors: Gunter Schloegl, Kelkheim; Ursula Murschall, Nierstein; Lothar Bothe, Mainz; Guenther Crass, Taunusstein, all of Fed. Rep. of Germany

[73] Assignee: Hoechst Aktiengesellschaft, Frankfurt am Main, Fed. Rep. of Germany

[21] Appl. No.: 464,216

[22] Filed: Jan. 12, 1990

[30] Foreign Application Priority Data

Jan. 24, 1989 [DE] Fed. Rep. of Germany ....... 3901969

[51] Int. Cl.$^5$ .............................................. B32B 5/16
[52] U.S. Cl. .................................... 428/323; 428/330; 428/403; 428/407; 428/521
[58] Field of Search ............... 428/212, 215, 216, 439, 428/515, 403, 407, 330, 323, 521; 524/251, 418

[56] References Cited

U.S. PATENT DOCUMENTS

| 4,692,837 | 9/1987 | Crass et al. | 361/313 |
| 4,715,986 | 12/1987 | Grüning et al. | 428/403 |
| 4,734,317 | 3/1988 | Bothe et al. | 428/215 |
| 4,822,350 | 4/1989 | Ito et al. | 604/372 |
| 4,975,315 | 12/1990 | Bothe et al. | 428/216 |

FOREIGN PATENT DOCUMENTS

| 0221659 | 5/1987 | European Pat. Off. . |
| 0212486 | 1/1988 | European Pat. Off. . |
| 3106871A1 | 12/1981 | Fed. Rep. of Germany . |
| 3805165 | 8/1989 | Fed. Rep. of Germany . |
| 2346399 | 10/1977 | France . |

OTHER PUBLICATIONS

T. J. Henman, "World Index of Polyolefine Stabilizers", Kogan Page Ltd., London, 1982, pp. 12, 202–219, 240–243.

Primary Examiner—Paul J. Thibodeau
Assistant Examiner—Hoa T. Le
Attorney, Agent, or Firm—Foley & Lardner

[57] ABSTRACT

The biaxially oriented film based on a propylene polymer contains an inorganic particulate neutralizing agent, in particular a carbonate or magnesium oxide. To improve the slip properties, the particles have been given a hydrophobic coating, in particular a coating of wax, a fatty acid, a salt of a fatty acid or an ester of a fatty acid.

20 Claims, No Drawings

BIAXIALLY ORIENTED PLASTICS FILM

BACKGROUND OF THE INVENTION

1) Field of the Invention

The invention relates to a biaxially oriented film based on propylene polymers containing an inorganic particulate neutralizing agent coated with a hydrophobic coating to improve slip properties.

2) Prior Art

Even ultrapure raw materials for producing films of this kind contain a remainder of catalyst residues from the polymerization. Such catalyst constituents are, in particular, compounds based on aluminum, magnesium and chlorine.

When raw material is used to produce films, the active chlorine compounds present in the raw material must be neutralized. To effect neutralization, calcium stearate, tripotassium citrate or hydrotalcite are usually added to the polypropylene based film raw materials. However, these neutralizing agents have the disadvantage that the products formed in the course of the neutralization evaporate and lead to undesirable deposits on the machinery used in film production and processing. These deposits can drip as waxy droplets onto the film and thereby distinctly impair its quality. In other cases, the color quality of the film is reduced as a consequence of yellowing.

It is therefore an object of the present invention to provide a biaxially oriented film based on polyolefins which is free of the above-mentioned disadvantages. The purpose of the invention is thus to eliminate the danger of wax spots forming on the film surface in the course of film production and film processing.

Under a non-published proposal (German Application P 38 05 165.6), 0.005-0.5 percent by weight of carbonate particles are used as neutralizing agent in a film based on propylene polymers. Since this film is intended for use as an electrical insulating film, the film raw material is free of lubricants and does not contain any ionic constituents. The resulting film has improved electrical properties, its surface offers good adhesion to metal layers, and no wax spots are formed on it.

As has now been found, the use of carbonate particles in packaging films and industrial films based on polyolefins, which unlike electrical insulating films usually incorporate antistatic and lubricant additives, results in distinctly low performance with respect to lubricating and antistatic properties.

It is therefore a further object to provide a film containing a neutralizing agent which neither leads to the formation of wax spots, nor has an adverse effect on the effectiveness of the lubricating and antistatic additives required.

SUMMARY OF THE INVENTION

It has been found, surprisingly, that biaxially oriented films based on propylene polymers used as packaging films or for industrial applications, and containing antistatic and/or lubricant additives do not have the above-described disadvantages. The inorganic particles used as neutralizing agent have the coating according to the invention. The films have a lower coefficient of friction of less than 0.25 and a lower surface resistance of less than $10^{12}$.

In the broadest sense, the present invention relates to a biaxially oriented film based on propylene polymer containing inorganic particulate (as a neutralizing agent) having a hydrophobic hydrocarbon coating containing at least 8, and preferably at least 14 carbon atoms.

DESCRIPTION OF THE PREFERRED EMBODIMENTS

The film is composed of a propylene polymer, for example a propylene homopolymer having a high isotactic content, which is usually greater than or equal to 90 percent, and in particular greater than or equal to 95 percent by weight. The isotactic content is determined on the mass of the polymer minus the mass of the n-heptane-soluble content. It is also suitable, according to the invention, to use a copolymer predominately composed of propylene units. Further units of such a propylene copolymer comprise alpha-olefins containing, in particular, 2 to 6 carbon atoms. Suitable copolymers of propylene are, for example, block copolymers or random copolymers of propylene with $C_2$-, $C_4$-, or $C_8$-alpha-olefins, in particular ethylene. The proportion of propylene units in the copolymer is usually at least 80 percent and in particular at least 90 percent by weight. It is also possible to use a polyblend consisting predominately of, and preferably not less than 75 percent by weight of isotactic propylene homopolymer and the copolymer and/or other polyolefins containing, in particular, 2 to 6 carbon atoms. Suitable polyolefins in the polyblend are, in particular, HDPE, LDPE, LLDPE and polyolefin 4-methyl-1-pentene; the proportions of these polyolefins each usually do not exceed 15 percent by weight, based on the polyblend. The propylene polymer advantageously has a melt flow index of 0.5 g/10 min to 8.0 g/10 min, and in particular 1.5 g/10 min to 4.5 g/10 min, at 230° C. under a load of 2.16 kp (DIN 53 735).

The level of inorganic neutralizing agent depends on the chlorine content of the raw material and is in general 0.005 to 0.7 percent by weight, with the range from 0.01 to 0.4 percent by weight giving the best results. The absolute particle size should not exceed 10, and in particular 8 micrometers since larger particles lead to the formation of specks and bubbles ("fisheyes") which, because of the air occluded therein impair the optical properties of the film. It is particularly advantageous if the absolute particle size does not exceed the film thickness, since otherwise these particles protrude from the film surface. For this reason it is also advantageous to use particles having a very small average particle diameter, which should not exceed 0.5, and preferably 0.1, and in particular 0.07 micrometer.

The inorganic, particulate neutralizing agent usually consists essentially of carbonates, in particular alkali metal or alkaline earth metal carbonates, alkaline which must be sufficiently thermostable to survive the extrusion of the plastics melt in the course of the manufacture of the film. It has proved particularly advantageous to use calcium carbonate or magnesium oxide or mixtures thereof.

The calcium carbonate particles consist, for example, of natural rock powder, for example limespar, limestone, or chalk, unless heavily contaminated by other substance.

It is preferable, however, to use carbonate particles produced by precipitation, which are of adequate whiteness, so that yellowing of the film is safely prevented. The whiteness of the carbonate particles should be at least 80 percent, preferably at least 90 percent, and in particular at least 95 percent Whiteness is measured according to DIN 53 163 with an "ELREPHO" electrical reflectance photometer, manufactured by Zeiss, Oberkochem (Germany), standard light C, 2° standard obsever. The degree of whiteness is defined as $$WG = RY + 3RZ - 3RX$$

where WG is the degree of whiteness and RY, RZ and RX are corresponding reflection factors on using the Y, Z and X colorimetric filters. The whiteness standard used is a compressed blank of barium sulfate (DIN 5033, Part 9). A film sample (size DIN A4) is irradiated for several days, radiation intensity 765 W/M$^2$, in a Suntest CPS apparatus, manufactured by Heraeus, Hanau (Germany) and then compared to a non-irradiated sample with the unaided eye. To obtain good neutralization, it is also advantageous to use carbonate particles having a relatively large specific surface area. It should be at least 80 m$^2$/g (measured by the BET method).

Precipitated calcium carbonate can be prepared in various ways. It is usual for this purpose to decompose natural rock powder based on calcium carbonate, in particular natural limestone, into calcium oxide and carbon dioxide at above 900° C. After the burnt lime has been slaked with water, it is carbonized with purified carbon dioxide. The calcium carbonate particles are obtained in aqueous suspension.

It is essential to the invention that the inorganic particles have a coating based on hydrophobic compounds, in particular compounds which contain hydrocarbon chains and have at least 8, and in particular at least 14 carbon atoms. For this purpose, these compounds are added in an emulsified form to the inorganic particles in aqueous suspension, and the water is removed. Suitable coating materials are, in particular, natural or synthetic waxes based on hydrocarbons, acids, esters, soaps, or acid amides; polypropylene waxes or polyethylene waxes; also fatty acids preferably of 8 to 30, and in particular 14 to 24 carbon atoms; their sodium or potassium salts, or their alkyl esters containing in particular 1 to 18 carbon atoms. The fatty acids, their salts and esters are obtained, in particular, from animal or vegetable fats or oils, for example, from soybean oil, palm oil, coconut oil or groundnut oil, and they consequently take the form of mixtures of various higher fatty acids. Particular preference is given to using palmitic acid, stearic acid or hydroxystearic acid, their alkali metal salts or alkyl esters of 1 to 18 carbon atoms, for example methyl, butyl or decyl stearate. It is also possible to use mixtures of these compounds as coating material. The emulsifier used can be a customary ionic or nonionic surface-active agent.

The weight of coating material should ideally be greater than or equal to 10, and in particular greater than or equal to 25 g, based on 1 kg of inorganic particles, in order that no activity due to the incorporated lubricants and antistatic agents is lost.

The lubricants used can be carboxyamides, preferably fatty acid amides of 14 to 22 carbon atoms, and in particular stearamide or erucamide, in a concentration of 0.3 to 0.4 percent by weight, based on the film.

The lubricants used can also be polydiorganosiloxanes or mixtures thereof. Their viscosity measured at 25° C. should be at least 100 mm$^2$/s. The advantageous concentration is 0.1 to 1.5 percent by weight of polydiorganosiloxane, based on the film.

Examples of suitable polydiorganosiloxanes are polydialkylsiloxanes, polyalkylphenylsiloxanes, olefin-modified silicone oils, polyether-modified silicone oils, epoxy-modified silicone oils and alcohol-modified silicone oils. Polydialkylsiloxanes having 1 to 4 carbon atoms in the alkyl group are preferred.

Suitable antistats are tertiary amines, such as N,N-bis-(2-hydroxyethyl)alkylamine (alkyl = $C_{14}$–$C_{28}$), used in a concentration of 0.02 to 0.3 percent by weight, based on the film.

Suitable antioxidants are ordinarily sterically hindered phenols, thioethers, phosphites and phosphonites. A comprehensive list of stabilizers for propylene polymers is given by T.J. Henman in the "World Index of Polyolefine Stabilizers", Kogan Page Ltd., London, 1982. Suitable compounds are described in particular in EP-A-0,222,296. These compounds are usually employed in an amount of up to 1, and in particular up to 0.5 percent by weight in the film.

A film according to the invention can be produced as a monofilm or as coextruded multilayer film, in which case it has a topcoat, for example of heat-sealable material, on either or both surfaces. It is also possible to produce the coextruded film from multiple layers of identical or different propylene polymers, in which case the inorganic particles of the invention are uniformly distributed in all the layers.

To produce the film according to the invention, the melt is extruded or coextruded from a film die at an extrusion temperature of 260° C. to 290° C., and the resulting film is solidified by cooling, then longitudinally oriented at a temperature of 120° C. to 150° C. in a ratio of 5:1 to 7:1, and transversely oriented at a temperature of 160° C. to 180° C. in a ratio of 8:1 to 10:1. Finally, the biaxially oriented film is heat-set at 140° C. to 160° C.

The film usually has a thickness of 8 to 50, and in particular 15 to 50 micrometers. Any heat-sealable top layers present have a customary thickness of less than 3 micrometers, and in particular less than 1 micrometer.

The film is used as an industrial film, for example as a film base for adhesive tapes, as a separating film in the manufacture of decorative laminates, or as a laminating film.

It is very particularly advantageous to use it as a packaging film, performing satisfactorily even on high-speed packaging machines. It has a distinctively lower coefficient of friction and surface resistance than a film which contains inorganic particles without the hydrophobic coating.

The invention is further illustrated with reference to the Examples below.

The films described in the Operative and Comparative Examples are: multilayer films each 20 micrometers in thickness, and monofilms each 10 micrometers in thickness.

OPERATIVE EXAMPLE

Using the coextrusion technique, 1 mm thick multilayer films are extruded from a film die at an extrusion temperature of 275° C. They consist of a base layer of polypropylene and two surface layers, one on either side, of a $C_2/C_3$-copolymer.

After an air passage these films are quenched on a chill roll, heated to 130° C. and oriented at 5:1 in the longitudinal direction and then, with an air temperature of 175° C., at 10:1 in the transverse direction. The film is then heat-set at 150° C.

The base layer of these multilayer films has a thickness of about 19 micrometers; on either side there is a sealable layer 0.5 to 0.8 micrometers in thickness.

The raw material used for the base layer was a propylene homopolymer having an isotactic content of 96.5 percent, a stabilizer content of 0.1 percent by weight of 1,3,5-trimethyl-2,4,6-tris-(3,5-di-tert.-butyl-4-hydroxybenzyl)benzene, and an antistat content of 0.13 percent by weight of N,N-bis(2-hydroxyethyl)alkylamine, alkyl denoting $C_{14}$ to $C_{18}$.

The sealable layers consist of a random copolymer of ethylene and propylene having an ethylene content of 4.5 percent by weight, based on the amount of copolymer, and containing 0.8 percent by weight, based on the sealable layers, of a polydimethylsiloxane having a kinematic viscosity of 30,000 mm²/s at 25° C.

A total of 8 films were produced containing stearic acid-coated calcium carbonate particles as neutralizing agent in concentrations of 0.02 to 0.3 percent by weight based on the total weight of the film. The average particle diameter was 0.02 micrometers, the specific surface area of the particles was 80 m²/g, and the whiteness was 95 percent. The coating weight of stearic acid was 29 g per kg of carbonate particles.

Comparative Examples

1. The method of the preceding Operative Example is used to produce a total of 8 films containing 0.02 to 0.3 percent by weight, based on the film, of calcium carbonate particles as a neutralizing agent which, however, have not been surface coated.

2. The same method is used to produce another 8 films in total containing calcium carbonate particles as neutralizing agent with calcium stearate in concentrations of 0.02 to 0.3 percent by weight, based on the film.

The films produced by the Operative Example are completely free of wax spots and have very good antistatic and excellent slip properties. It is true that the films obtained by the first Comparative Example are likewise free of wax spots, but they have completely inadequate antistatic properties and tend to block on passing through packaging machines, so that the packaging process is interrupted. It is true that the films of Comparative Example 2 are free from the latter defects, but they are unsuitable for use as packaging films owing to wax spots The coating of stearic acid on the carbonate particles has the surprising effect of eliminating the interaction between the carbonate particles and the lubricant/antistat which evidently has an adverse effect on the slip properties of the film.

It has also been found that the coated carbonate particles show better dispersibility, and are more easily homogenizable into the plastics melt, than uncoated carbonate particles, which tend to form aggregates.

What is claimed is:

1. A biaxially oriented film based on propylene polymer containing 0.005 to 0.7 percent by weight of an inorganic particulate neutralizing agent having a particle size not greater than about 10 micrometers and having a coating based on a hydrophobic compound containing a hydrocarbon chain of at least 8 carbon atoms.

2. The film as claimed in claim 1, containing from 0.01 to 0.4 percent by weight of the inorganic particles.

3. The film as claimed in claim 1, wherein the inorganic particles comprise calcium carbonate or magnesium oxide, or mixtures thereof.

4. The film as claimed in claim 1, wherein the average particle diameter is equal to or less than 0.5 micrometer.

5. The film as claimed in claim 4, wherein the average particle diameter is less than 0.1 micrometer.

6. The film as claimed in claim 5, wherein the average particle diameter is less than 0.07 micrometer.

7. The film as claimed in claim 1, wherein the specific surface area of the particles is greater than or equal to 40 m²/g.

8. The film as claimed in claim 7, wherein the specific surface area of the particles is greater than or equal to 80 m²/g.

9. The film as claimed in claim 1, wherein the whiteness of the particles is greater than or equal to 80 percent, measured according to DIN 53 163.

10. The film as claimed in claim 9, wherein the whiteness of the particles is greater than or equal to 95 percent measured according to DIN 53 163.

11. The film as claimed in claim 1, wherein the coating weight is at least 10 g per kg of the particles present in the film.

12. The film as claimed in claim 11, wherein the coating weight is at least 25 g per kg of the particles present in the film.

13. The film as claimed in claim 1, wherein the coating is selected from the group consisting of a wax, a fatty acid, an alkali metal salt thereof, an alkyl ester thereof having 1 to 18 carbon atoms, and a mixture thereof.

14. The film as claimed in claim 1, which has on at least one of its surfaces a coextruded heat-sealable polyolefinic layer.

15. The film as claimed in claim 1, which contains 0.02 to 0.3 percent by weight of a tertiary amine having a long-chain alkyl group as an antistat and 0.1 to 1.5 percent by weight of a lubricant.

16. The film as claimed in claim 15, wherein said tertiary amine is N,N-bis(2-hydroxyethyl)alkylamine.

17. The film as claimed in claim 15, wherein said lubricant is polydiorganosiloxane.

18. The film as claimed in claim 2, wherein the average particle diameter is less than 0.07 micrometer.

19. The film as claimed in claim 18, wherein the specific surface area of the particles is greater than or equal to 80 m²/g.

20. The film as claimed in claim 1, wherein the hydrophobic compounds has a hydrocarbon chain of at least 14 carbon atoms.

* * * * *